United States Patent
Lefeuvre

[11] 3,751,089
[45] Aug. 7, 1973

[54] FRANGIBLE SHOCK ABSORBING BUMPER

[75] Inventor: Andre Lefeuvre, Billancourt, France

[73] Assignees: Regie Nationale Des Usines Renault, Billancourt (Hauts de Seine); Automobiles Peugeot, Paris, both of France

[22] Filed: Sept. 3, 1971

[21] Appl. No.: 177,591

[30] Foreign Application Priority Data
Sept. 17, 1970 France .............................. 7033727
Jan. 11, 1971 France .............................. 7100645

[52] U.S. Cl. ................... 293/1, 188/1 C, 213/1 A, 293/9, 293/73, 293/84

[51] Int. Cl. .... B60r 19/04, B61f 19/04, F16d 63/00

[58] Field of Search ................ 105/392.5; 293/1, 293/9, 84, 86, 63, 71 P, 73; 188/1 C; 213/1 A

[56] References Cited
UNITED STATES PATENTS

| | | | |
|---|---|---|---|
| 2,811,385 | 10/1957 | Butler | 293/86 |
| 3,138,118 | 6/1964 | Dean | 105/392.5 |
| 3,346,292 | 10/1967 | Lundman | 293/9 |
| 3,355,208 | 11/1967 | Brock | 293/9 |
| 3,663,048 | 5/1972 | Zimmerle | 293/84 |

Primary Examiner—Gerald M. Forlenza
Assistant Examiner—Howard Beltran
Attorney—Stevens, Davis, Miller & Mosher

[57] ABSTRACT

A frangible shock absorbing bumper device for automotive vehicles, characterized in that it comprises an auxiliary chassis disposed at the end of the main chassis of the vehicle or of the structure corresponding thereto, the auxiliary chassis being connected to said main chassis by at least one element so arranged as to undergo a permanent deformation by shearing according to a predetermined law, the resistance to deformation of the element being lower than the resistance to deformation of the main chassis.

8 Claims, 4 Drawing Figures

PATENTED AUG 7 1973

FRANGIBLE SHOCK ABSORBING BUMPER

The present invention relates in general to shock absorbers for automobiles and has specific reference to a device adapted to gradually slow down and bring to complete standstill a vehicle in motion without any restitution of the thus absorbed kinetic energy.

Various attempts have been made with a view for equipping the bumpers of automotive vehicles with resilient means adapted to retard the possible contact with an obstacle against which the vehicle may be caused to impinge. So far the results obtained on these lines are scarcely satisfactory due notably to the fact that the energy absorbed by the resilient elements were subsequently restituted and constituted a source of severe discomfort for the passengers of the vehicle.

The device according to the present invention avoids the inconvenience set forth hereinabove in that it dissipates the kinetic energy absorbed during a shock throughout the desired range, the deceleration curve of the vehicle being determined beforehand at will by properly selecting the various characteristic parameters.

Another feature characterizing this invention lies in the possibility of reducing the overall length of the vehicle equipped with this device, in the inoperative position thereof, for example for facilitating parking maneuvers.

It is the essential object of the present invention to provide a shock absorbing device capable of dissipating without any subsequent restitution the kinetic energy released during the shock of the vehicle equipped therewith, while gradually braking the vehicle, this device consisting of an auxiliary chassis connected to one end of the main chassis of the vehicle, or other structure corresponding thereto, and comprising preferably deformable elements or blocks so disposed as to be torn up in succession or by partial groups under shearing stress, in order gradually to absorb the kinetic energy released by a shock produced between said auxiliary chassis and an obstacle, the ultimate strength of each individual block or of a group of blocks expected to break simultaneously being lower than the resistance to deformation of the main chassis of the vehicle. This shock absorbing device is adapted on the other hand to assume at will either a spread or operative position, or a collapsed or inoperative position in order to limit its overall longitudinal dimensions when the vehicle is at a standstill.

According to a modified form of embodiment the breaking of blocks is replaced by the tearing of a metal sheet of suitable thickness by means of cutters rigid with said auxiliary chassis.

The attached drawings illustrate diagrammatically by way of illustration a typical form of embodiment of the instant invention. In the drawings.

Figure 1:
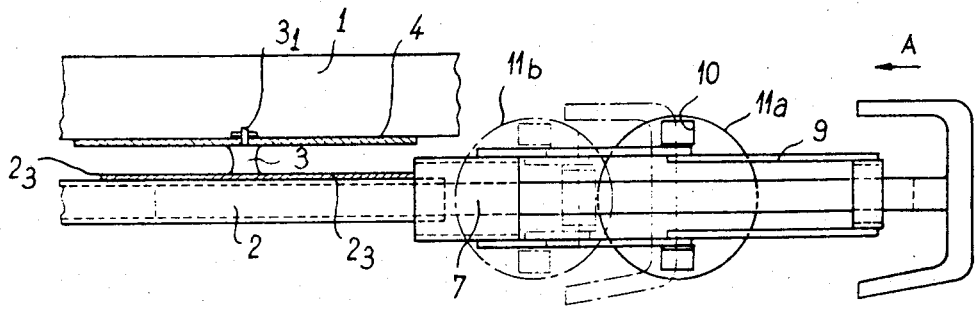
FIG. 1 is a fragmentary side elevational and section view of the auxiliary chassis disposed between the bumper and the main chassis of the vehicle, for instance an automotive vehicle.

Referring first to FIG. 1, the end portion of the main chassis 1 of a vehicle is equipped with an auxiliary chassis 2 comprising longitudinal side members $2_1$, $2_2$ supporting a metal sheet or plate $2_3$ to which blocks 3 preferably of elastic material are secured. The chassis 1 carries on the other hand a metal plate 4 in which circular or elongated apertures of unequal lengths are formed; these apertures 5 receiving therein the heads of said blocks 3.

No play is left between the heads of the elements or blocks 3 and the corresponding circular orifices $5_1$; in contrast thereto, the heads extending through the elongated apertures $5_2$, $5_3$ are adapted, in case of a sliding movement of the auxiliary chassis 2 in relation to plate 4, to slide freely through a certain distance as a function of the length of the relevant orifice.

The side members $2_1$, $2_2$ of the auxiliary chassis consist of tubular sections or elements of any other suitable cross-sectional configuration, preferably hollow, in which one end of a bar 7 of corresponding cross-sectional contour is adapted to slide, the other end of this bar 7 being rigidly connected to a bumper 8 of the vehicle. Two sets of pivotally interconnected links 9, preferably of the knee-action type, are secured on the one hand at 9a to bars 7, and on the other hand at 9b to said tubular members 2 so that the pivot pins 10 may move from a retracted position shown in dash and dot lines in FIGS. 1 and 2 to an extended position shown in thick lines in these Figures, with the pivot pins 10 lying outside the axes of said bars 7.

Between said pivot pins 10 a bellows 11 may be disposed. This bellows 11 is adapted to be contracted by applying thereto a vacuum or depression derived from the engine, so as to fold the links 9 inwards and move the bumper 8 in the direction of the arrow A, the bellows moving from position 11a to position 11b. The links 9 are returned to their extended position by feeding fluid under pressure to the bellows 11, or alternately by using return springs or other suitable and known means.

Thus, in case of a front shock occurring when the device is in its extended position as required during normal driving conditions, the bumper 8 can recede throughout the length of bars 7 then projecting ahead of the vehicle body, before the obstacle engages the body. This distance may be for example of the order of 12 to 16 inches.

During the bumper movement transmitted via links 9 to the auxiliary chassis 2, and therefore to the fastening blocks 3, a shearing stress is applied to the plate 4.

In the preferred construction utilizing blocks 3 of elastic material these are subjected to elastic deformation by lamination in a direction parallel to the plate 4 up to their breaking point. The energy absorbed by the rupture is not restituted and is deducted from the total energy produced by the shock. The elements $3_1$ engaging the circular apertures $5_1$ break first, then the residual energy causes the auxiliary chassis to continue its movement in the direction of the arrow A until the blocks $3_2$ engage with their heads the ends $5'_2$ of orifices $5_2$ so that shearing stresses are applied for the first time to these blocks, since throughout the movement corresponding to the elastic deformation of the preceding blocks 3 these blocks $3_2$ were allowed to slide freely in the slots $5_2$.

Similarly, during this operation, the elements $3_3$ travelling easily in the slots $5_3$ remain unstressed until the yielding elements $3_2$ cause the movable chassis 2 to recede until the elements $3_3$ abut in turn against the ends $5'_3$ of slots $5_3$.

Under these conditions it is clear that the deceleration curve of the vehicle and the amount of energy absorbed by the device may be determined beforehand as a function of parameters such as:
physical properties of the material of blocks 3,
number of blocks 3,
cross-sectional shape and dimensions of the elements subjected to shearing stresses,
number of plates 5.

In the structure illustrated in FIG. 2, 12 elements 3 are used; these elements 3 being disposed in series-parallel relationship and according to the principle set forth hereinabove.

Figure 3:
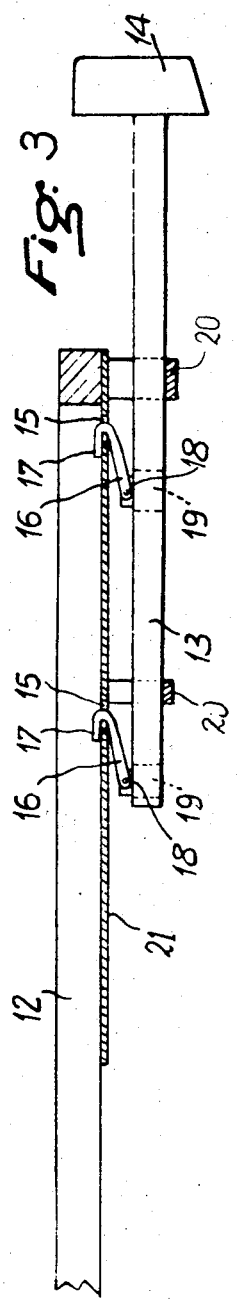
FIG. 3 is an elevational view showing a modified form of embodiment comprising a tear-up metal sheet.
Figure 4:
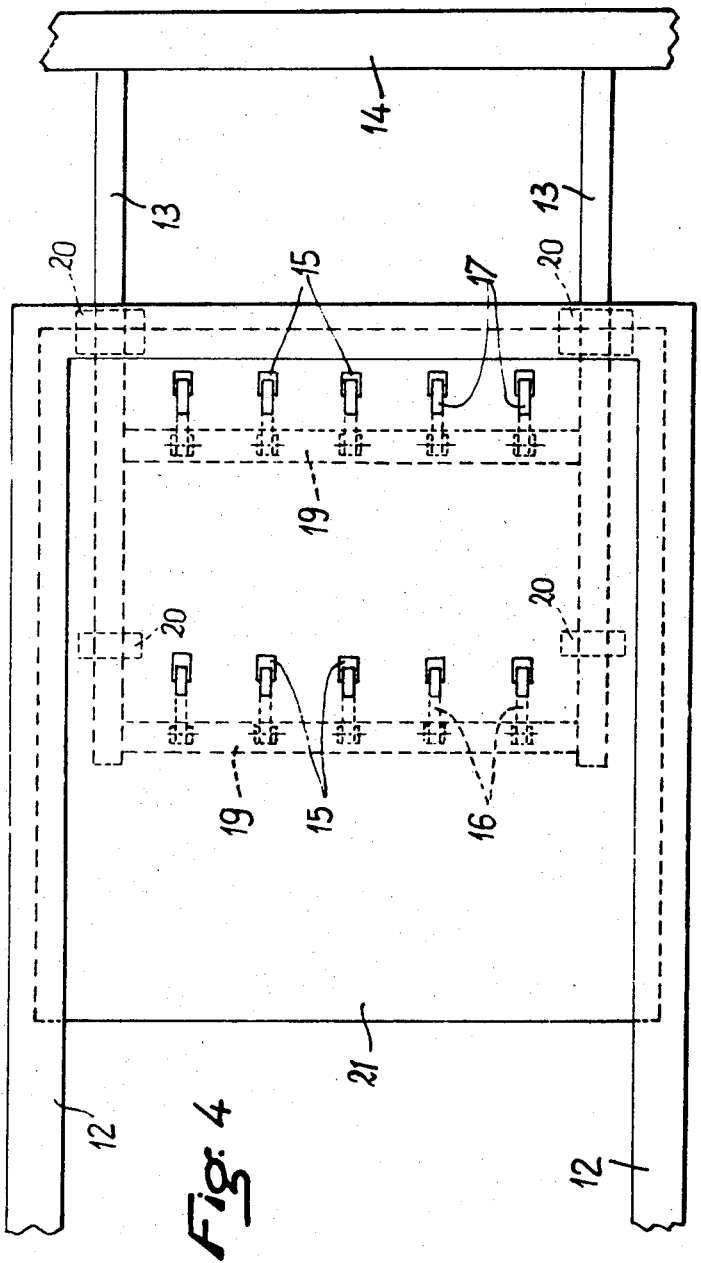
FIG. 4 is a corresponding plane view from above.

In the modified form of embodiment illustrated in FIGS. 3 and 4 of the drawings the main chassis 12 of the vehicle is completed by an auxiliary chassis comprising side members 13 supporting a bumper 14. These side members 13 adapted to recede for example by sliding in sleeves 20 carried by the main chassis are interconnected by cross members 19 having pivoted thereto by means of pins 18 a plurality of cutters 16 provided with hook-shaped heads 17.

Preferably, the sleeves 20 consist of high-elasticity elastomeric material so that the auxiliary chassis may assume different angular positions in case of shock.

Underlying the main chassis 12 and firmly secured thereto in a horizontal plane, for example by means of bolts (not shown), is a plate 21 formed with two series of orifices 15 engaged by the aforesaid hook-shaped heads 17 with the V-shaped concavity facing to the rear and engaging the edge of the plate. The shape and dimensions of the orifices 15 and hooks 17 are so selected that when each hook has been engaged into the corresponding orifice it cannot escape therefrom, for example as a consequence of suspension jolts and beats, or in case of shock. Thus, for example, the arrangement may be such that to remove the cutter from its orifice the pivot pin thereof must be removed from the corresponding hinge.

In case of front shock the side members 13 are pushed backwards by the bumper 14 and carry along the cutters 16 in which the V-shaped heads 17 engaged in the corresponding orifices 15 will cut the plate 21 through a length proportional to the force developed by the shock.

If desired, the sleeves 20 as well as the pivot means 18 may have vertical axes, possibly with a certain free lateral clearance to permit the proper orientation of the auxiliary chassis in or towards the direction of the shock.

Practical tests proved that under these conditions a 2-mm thick plate was cut when the stress attained a value of about 800 kg per cutter.

The number of cutters, and their arrangement in one or several rows, are subordinate to the mass of the vehicle and also of the force of the shock to be damped out.

Figure 2:
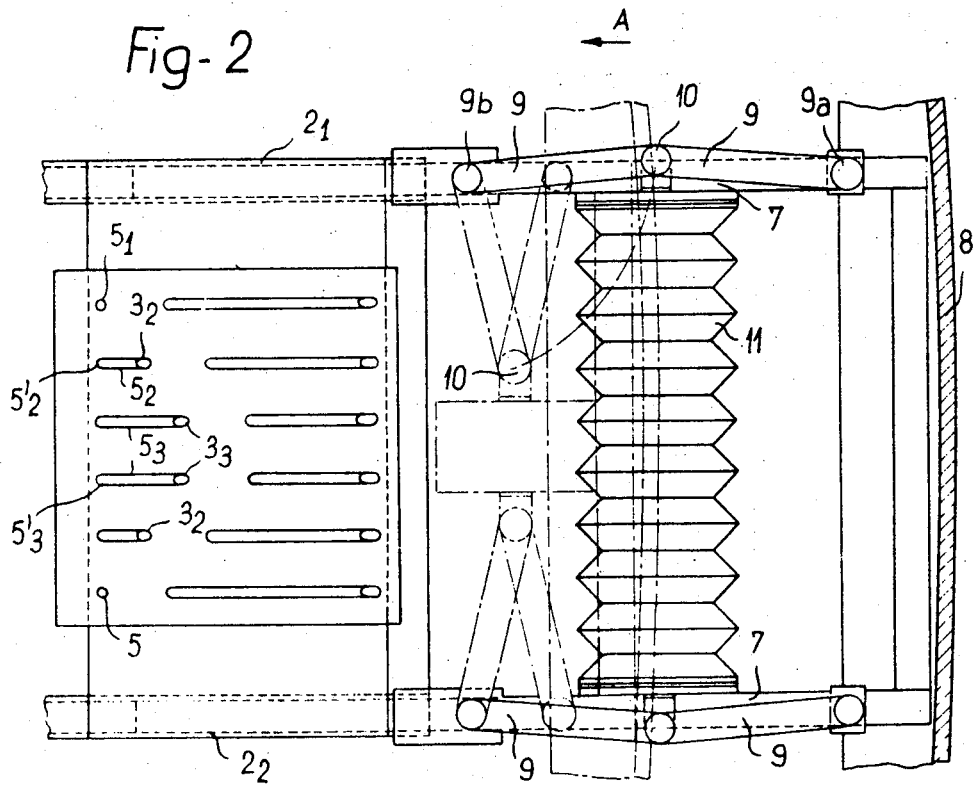
FIG. 2 is a plane view from above of the assembly shown in FIG. 1.

According to a preferred form of embodiment of this invention the shock absorption device illustrated in FIGS. 1 and 2 is combined with the device illustrated in FIGS. 3 and 4 of the drawings. This arrangement permits the absorption of shocks of a force inferior to that necessary for tearing out the metal plate incorporated in the device of this invention. In this case, only a few elastic elements of the first device would break up.

Alternatively, a plurality of devices of the types disclosed hereinabove may be combined and disposed at different levels in order to increase the shock absorption capacity of the vehicle equipped therewith, or the plate thickness may vary in the direction of travel of the cutters during a shock.

Of course the above description should not be construed as limiting the field of the invention since various modifications and changes could be brought thereto without departing from the spirit and scope of the invention. Thus, the bellows 11 may be disposed perpendicularly to the position illustrated in the drawings, or replaced by an electric motor or hydraulic cylinder and piston devices. Also, the device may be mounted indifferently at the front and at the rear of the vehicle.

What is claimed as new is:

1. Shock absorbing device for automotive vehicles having a first chassis, said shock absorbing device comprising an auxiliary second chassis disposed at the end of the first chassis and being movable relative to said first chassis, a plurality of deformable elements having heads, said elements being fixed on said auxiliary chassis, a metal plate fixed onto the first chassis and having elongated apertures in which said heads fit, the relation between said plate and said elements being such that relative movement between said first chassis and said auxiliary chassis causes a shearing action on said elements, the resistance to deformation of said elements being lower than the resistance to deformation of the first chassis.

2. Device according to claim 1, characterized in that said auxiliary chassis comprises hollow longitudinal side members rigidly connected through said deformable elements to the first chassis, each side member having slidably fitted therein one end of a bar having its opposite end connected to the bumper of the vehicle through knee-action links disposed between said bars and the side members of the auxiliary chassis, to permit locking of the device in its extended position.

3. Device according to claim 2, characterized in that a bellows is provided for controlling the release of said knee-action links as well as the sliding movements of said bars connected to the bumper in said side members of the auxiliary chassis, each end of said bellows being attached to one pivot pin of said knee action links, said bellows being responsive to the vacuum created by the engine of the vehicle.

4. Device according to claim 1, characterized in that said deformable elements are all secured with one end to said auxiliary chassis, the other end of some of these elements being fixedly connected to said metal plate rigid with said first chassis, the corresponding ends of the other deformable elements being adapted to move freely in apertures of different lengths formed in said plate.

5. Device according to claim 4, characterized in that said deformable elements are adapted to absorb shocks of low strength.

6. Device according to claim 1, further characterized in that said first chassis has rigidly fastened thereto a sheet metal plate formed with apertures engaged by cutters pivoted to the auxiliary chassis and adapted to move in relation to said first chassis in case of shock, said cutters having hook-shaped heads adapted to be engaged permanently in said plate apertures.

7. Device according to claim 5, characterized in that said sheet metal plate is disposed in a horizontal plane under the first chassis and that said cutters comprise each at their free end a V-shaped hook disposed in a vertical plane and having its point directed towards the shock-receiving side, the aperture of said V-shaped hook engaging the edge of the plate rigid with the first chassis.

8. Device according to claim 2, characterized in that said plate has a thickness varying in the direction of travel of said cutters.

* * * * *